(12) United States Patent
Saffouri (10) Patent No.: US 11,745,270 B2
(45) Date of Patent: Sep. 5, 2023

(54) TOOL HOLDER HAVING ANTI-VIBRATION ARRANGEMENT AND COOLANT CHANNEL, AND CUTTING TOOL PROVIDED WITH TOOL HOLDER

(71) Applicant: ISCAR, LTD., Tefen (IL)

(72) Inventor: Jony Saffouri, Nazareth Eilit (IL)

(73) Assignee: Iscar, Ltd., Tefen (IL)

( * ) Notice: Subject to any disclaimer, the term of this patent is extended or adjusted under 35 U.S.C. 154(b) by 199 days.

(21) Appl. No.: 17/467,828

(22) Filed: Sep. 7, 2021

(65) Prior Publication Data

US 2023/0076841 A1    Mar. 9, 2023

(51) Int. Cl.

| | |
|---|---|
| *B23Q 11/10* | (2006.01) |
| *B23B 29/02* | (2006.01) |
| *B23B 29/12* | (2006.01) |
| *F16F 7/08* | (2006.01) |
| *B23B 27/10* | (2006.01) |
| *B23B 27/16* | (2006.01) |
| *B23B 27/00* | (2006.01) |

(52) U.S. Cl.
CPC .............. *B23B 27/10* (2013.01); *B23B 27/16* (2013.01); *B23B 27/002* (2013.01); *B23B 29/022* (2013.01); *B23B 2250/16* (2013.01)

(58) Field of Classification Search
CPC .............. B23B 29/022; B23B 2250/16; B23B 27/002; B23B 27/10; B23B 27/16; B23B 29/08; B23B 2260/026; B23B 29/125; F16F 7/108; F16F 2228/007; F16F 7/104; B23Q 11/10

See application file for complete search history.

(56) References Cited

U.S. PATENT DOCUMENTS

| | | | | |
|---|---|---|---|---|
| 2,699,696 A | * | 1/1955 | Hahn | B23B 29/022 408/143 |
| 3,476,960 A | * | 11/1969 | Rees | B25F 5/02 310/216.118 |
| 3,559,512 A | * | 2/1971 | Aggarwal | F16F 7/10 188/322.5 |
| 3,642,378 A | * | 2/1972 | Hahn | B23B 29/022 408/143 |

(Continued)

OTHER PUBLICATIONS

International Search Report dated Dec. 6, 2022, issued in PCT counterpart application No. PCT/IL2022/050859.

(Continued)

*Primary Examiner* — Sara Addisu
(74) *Attorney, Agent, or Firm* — Womble Bond Dickinson (US) LLP (57) ABSTRACT

An elongated tool holder includes a mass housing portion having a housing peripheral surface, an outer sleeve having a sleeve hole wall surface, and an anti-vibration arrangement. An elongated groove is formed in one of the housing peripheral surface and the sleeve hole wall surface. In an assembled state of the tool holder, the groove, which is located at a common interface of the housing peripheral surface and the sleeve hole wall surface, forms a groove coolant channel. The groove coolant channel forms part of an overall tool holder coolant channel which is spaced apart from the anti-vibration arrangement, and thus isolates the coolant from the anti-vibration arrangement. A cutting tool incorporates the tool holder.

19 Claims, 4 Drawing Sheets

(56) References Cited

U.S. PATENT DOCUMENTS

| | | | |
|---|---|---|---|
| 3,690,414 A | 9/1972 | Aggarwal et al. | |
| 3,774,730 A * | 11/1973 | Maddux | B23B 29/022 |
| | | | 188/379 |
| 3,820,422 A * | 6/1974 | Rivin et al. | B23B 29/022 |
| | | | 82/158 |
| 3,838,936 A * | 10/1974 | Andreassen | F16F 7/108 |
| | | | 409/141 |
| 3,923,414 A * | 12/1975 | Hopkins | B23B 29/03 |
| | | | 82/904 |
| 4,050,665 A | 9/1977 | Matthews et al. | |
| 4,130,185 A | 12/1978 | Densmore | |
| 4,903,785 A | 2/1990 | Odoni et al. | |
| 7,681,869 B2 | 3/2010 | Digernes | |
| 8,371,776 B2 * | 2/2013 | Lin | B23B 27/002 |
| | | | 82/158 |
| 10,500,648 B1 * | 12/2019 | Saffouri | B33Y 80/00 |
| 11,305,359 B2 * | 4/2022 | Kimmich | B23B 29/04 |
| 11,458,544 B2 * | 10/2022 | Fu | B23C 5/003 |
| 2003/0147707 A1 | 8/2003 | Perkowski | |
| 2006/0275090 A1 | 12/2006 | Onozuka et al. | |
| 2010/0096228 A1 * | 4/2010 | Digernes | B23C 5/003 |
| | | | 188/269 |
| 2010/0242696 A1 * | 9/2010 | Digernes | B23B 27/10 |
| | | | 83/169 |
| 2011/0255932 A1 | 10/2011 | Cook et al. | |
| 2011/0318127 A1 | 12/2011 | Freyermuth et al. | |
| 2016/0067787 A1 * | 3/2016 | Giannetti | B23B 27/002 |
| | | | 29/407.01 |
| 2016/0214185 A1 | 7/2016 | Faessler et al. | |
| 2021/0291277 A1 | 9/2021 | Fu et al. | |
| 2022/0048149 A1 * | 2/2022 | Gonzui | B23B 29/022 |
| 2023/0116863 A1 * | 4/2023 | Fu | B23B 27/002 |
| | | | 408/143 |

OTHER PUBLICATIONS

Written Opinion dated Dec. 6, 2022, issued in PCT counterpart application No. PCT/IL2022/050859.

* cited by examiner

TOOL HOLDER HAVING ANTI-VIBRATION ARRANGEMENT AND COOLANT CHANNEL, AND CUTTING TOOL PROVIDED WITH TOOL HOLDER

FIELD OF THE INVENTION

The subject matter of the present application relates to tool holders, in general, and to such tool holders having an anti-vibration arrangement, in particular, and to such tool holders having a coolant channel, further in particular.

BACKGROUND OF THE INVENTION

Tool holders can be provided with an anti-vibration arrangement for suppressing vibration of the tool holder during metal cutting operations. Typically, the anti-vibration arrangement is a spring-mass system that includes a cavity and a vibration absorbing mass suspended therein by elastic supporting members. The cavity can be filled with a viscous fluid.

In some such anti-vibration arrangements an additional coolant channel is provided for providing cooling fluid to the cutting region. An example of such a tool holding system, is disclosed in, for example, U.S. Pat. No. 7,681,869 B2. U.S. Pat. No. 7,681,869 B2 discloses, in its FIG. 2, a damping body 1 provided with an axial boring 6 going therethrough. Inside the boring bar, there is an axially extending longitudinal tube 3 that generally is adapted to be rigidly secured at its outer ends inside a boring bar or to the object that is to be damped. The tube 3 is adapted to lead a cooling fluid through itself in communication with a channel extending further into the boring bar.

It is an object of the subject matter of the present application to provide a new and improved tool holder having an anti-vibration arrangement and a coolant channel.

SUMMARY OF THE INVENTION

In accordance with a first aspect of the subject matter of the present application there is provided a tool holder elongated along a holder longitudinal axis thereof which defines opposite forward and rearward directions, the tool holder configured to have a cutting portion affixed at a forward end thereof, the tool holder comprising:
an outer sleeve comprising:
opposite forward and rearward sleeve end surfaces and a sleeve peripheral surface extending therebetween; and
a sleeve hole having a sleeve hole wall surface which opens out to the forward and rearward sleeve end surfaces;
a mass housing portion comprising:
opposite forward and rearward housing end surfaces and a housing peripheral surface extending therebetween; and
an interior holder cavity having an inwardly facing cavity wall surface; and
an anti-vibration arrangement comprising:
a vibration absorbing mass comprising two opposite mass end surfaces and a mass peripheral surface extending therebetween; and
two resilient suspension members, wherein:
an elongated groove is formed in one of the housing peripheral surface and the sleeve hole wall surface; and the tool holder is adjustable between an unassembled state and an assembled state, and in the assembled state:
the vibration absorbing mass is disposed in the interior holder cavity and is elastically suspended therein by the two suspension members contacting the inwardly facing cavity wall surface;
the mass housing portion is at least partially located in the sleeve hole, such that at least a portion of the sleeve hole wall surface surrounds at least a portion of the housing peripheral surface about the holder longitudinal axis, thereby defining a common interface;
the groove is located at the common interface, thereby forming a groove coolant channel; and
the groove coolant channel is part of a tool holder coolant channel having an external coolant inlet and an external coolant outlet in fluid communication with each other.

In accordance with a second aspect of the subject matter of the present application there is provided a cutting tool comprising:
a tool holder of the type described above; and
a cutting portion located at a forward end of the tool holder, the cutting portion comprising at least one cutting insert.

It is understood that the above-said is a summary, and that features described hereinafter may be applicable in any combination to the subject matter of the present application, for example, any of the following features may be applicable to the tool holder or cutting tool:

The groove can be formed in the housing peripheral surface.

The sleeve hole wall surface can open out to the rearward sleeve end surface.

The groove can extend linearly along a groove axis. In the assembled state of the tool holder, the groove axis can be parallel to the holder longitudinal axis.

The mass housing portion can comprise a forward housing portion and a rearward housing portion, the forward housing portion being forward of, and having a greater radial dimension than, the rearward housing portion. In the assembled state of the tool holder, only the rearward housing portion can be located in the sleeve hole.

The housing peripheral surface can comprise a forward housing peripheral surface at the forward housing portion, a rearward housing peripheral surface at the rearward housing portion and a housing step surface connecting the forward housing peripheral surface and the rearward housing peripheral surface. The forward housing portion can comprise a forward housing coolant through channel opening out, at a rearward end thereof, to the housing step surface. In the assembled state of the tool holder, the groove coolant channel can extend to the forward housing coolant through channel. The forward housing coolant through channel can be part of the tool holder coolant channel.

The forward housing coolant through channel can further open out, at a forward end of the forward housing portion, to the housing peripheral surface to form the coolant outlet.

The mass housing portion can comprise a housing recess comprising an inwardly facing recess wall surface opening out to the rearward housing end surface. The tool holder can comprise a cavity axial sealing member. In the assembled state of the tool holder, the cavity axial sealing member can be located in the housing recess, delimiting the holder cavity in the rearward direction, so that a forward portion of the housing recess forms the interior holder cavity. The rearward housing portion can comprise a rearward housing coolant through channel opening out to the recess wall surface and the rearward housing peripheral surface. In the assembled state of the tool holder, the rearward housing coolant through channel can be rearward of the cavity axial sealing member, and the rearward housing coolant through channel can be part of the tool holder coolant channel.

The outer sleeve can comprise a forward outer sleeve component and a rearward outer sleeve component. The forward and rearward outer sleeve components can be fixedly engaged with each other, the forward outer sleeve component being forward of the rearward outer sleeve component.

In the assembled state of the tool holder, the forward sleeve end surface and the housing step surface can abut each other.

The rearward housing peripheral surface can comprise axially spaced apart front and back rearward housing peripheral surfaces and a middle rearward housing peripheral surface extending therebetween, the front rearward housing peripheral surface being closer to the forward housing portion than the back rearward housing peripheral surface. In the assembled state of the tool holder, at least the front and back rearward housing peripheral surfaces can abut the sleeve hole wall surface, respectively.

The groove can be formed in the housing peripheral surface. The groove can comprise two groove ends. The front rearward housing peripheral surface can intersect the housing step surface. One of the two groove ends can be located at the back rearward housing peripheral surfaces. The other one of the two groove ends can be located at the intersection of the front rearward housing peripheral surface and the housing step surface.

The middle rearward housing peripheral surface can be radially recessed with respect to the front and back rearward housing peripheral surfaces. In the assembled state of the tool holder, the middle rearward housing peripheral surface can be spaced apart from the sleeve hole wall surface.

The mass housing portion can comprise a housing recess comprising an inwardly facing recess wall surface opening out to the rearward housing end surface. The tool holder can comprise a cavity axial sealing member. In the assembled state of the tool holder, the cavity axial sealing member can be located in the housing recess, delimiting the holder cavity in the rearward direction, so that a forward portion of the housing recess forms the interior holder cavity.

In the assembled state of the tool holder, the recess wall surface can open out to the rearward housing end surface to form the coolant inlet. A portion of the housing recess extending from the coolant inlet can be part of the tool holder coolant channel.

The outer sleeve can comprise a sleeve material. The mass housing portion can comprise a housing body material. The sleeve material can be denser than the housing body material.

The sleeve material can be carbide.

The cutting portion can be releasably attached to the tool holder.

The coolant outlet can be rotationally aligned with the cutting insert about the holder longitudinal axis.

BRIEF DESCRIPTION OF THE FIGURES

For a better understanding of the present application and to show how the same may be carried out in practice, reference will now be made to the accompanying drawings, in which.

It will be appreciated that for simplicity and clarity of illustration, elements shown in the figures have not necessarily been drawn to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF THE INVENTION

In the following description, various aspects of the subject matter of the present application will be described. For purposes of explanation, specific configurations and details are set forth in sufficient detail to provide a thorough understanding of the subject matter of the present application. However, it will also be apparent to one skilled in the art that the subject matter of the present application can be practiced without the specific configurations and details presented herein.

Figure 1:
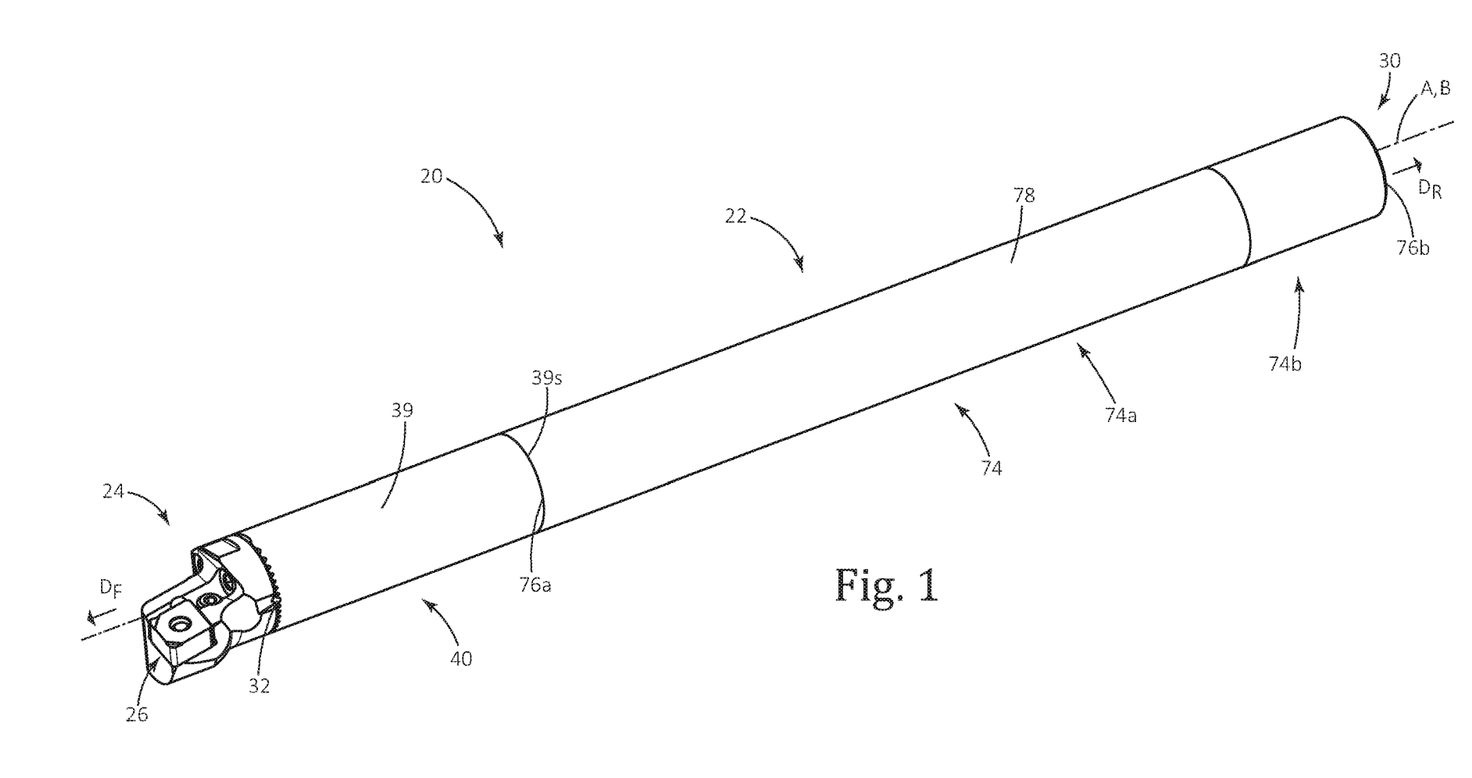
FIG. 1 is a perspective view of a cutting tool in accordance with the present application, showing an anti-vibration arrangement.

Attention is first drawn to FIG. 1 showing a cutting tool 20, for chip removal, depicting an aspect of the present application. The cutting tool 20 has a tool longitudinal axis A. In accordance with some embodiments of the subject matter of the present application, the cutting tool 20 can be a fixed cutting tool. That is to say, the cutting tool 20 is not designed to rotate about a rotational axis. In this non-limiting example shown in the drawings, the cutting tool 20 is a boring bar. However, the subject matter of the present application is not restricted only to boring bars and could also be applicable to, for example but not limited to, turning tools in general. The subject matter of the present application may also be applicable to rotary cutting tools, such as milling cutters and drills. For such rotary cutting tools, the cutting tool 20 is designed to be rotatable in a direction of rotation about the tool longitudinal axis A.

The cutting tool 20 includes a tool holder 22. The cutting tool 20 also includes a cutting portion 24 that can include at least one cutting insert 26. The at least one cutting insert 26 is designed to perform metal cutting operations and has a cutting edge for that purpose. In accordance with some embodiments of the subject matter of the present application, the at least one cutting insert 26 can be releasably attached to the cutting portion 24. The cutting portion 24 can be integrally formed with the tool holder 22. Alternatively, as seen in the non-limiting example shown in the drawings, the cutting portion 24 can be releasably attached to the tool holder 22. The cutting portion 24 can be disposed at a forward end of the tool holder 22. The rear end of the tool holder 22 is configured to be secured by a holding device.

Figure 2:
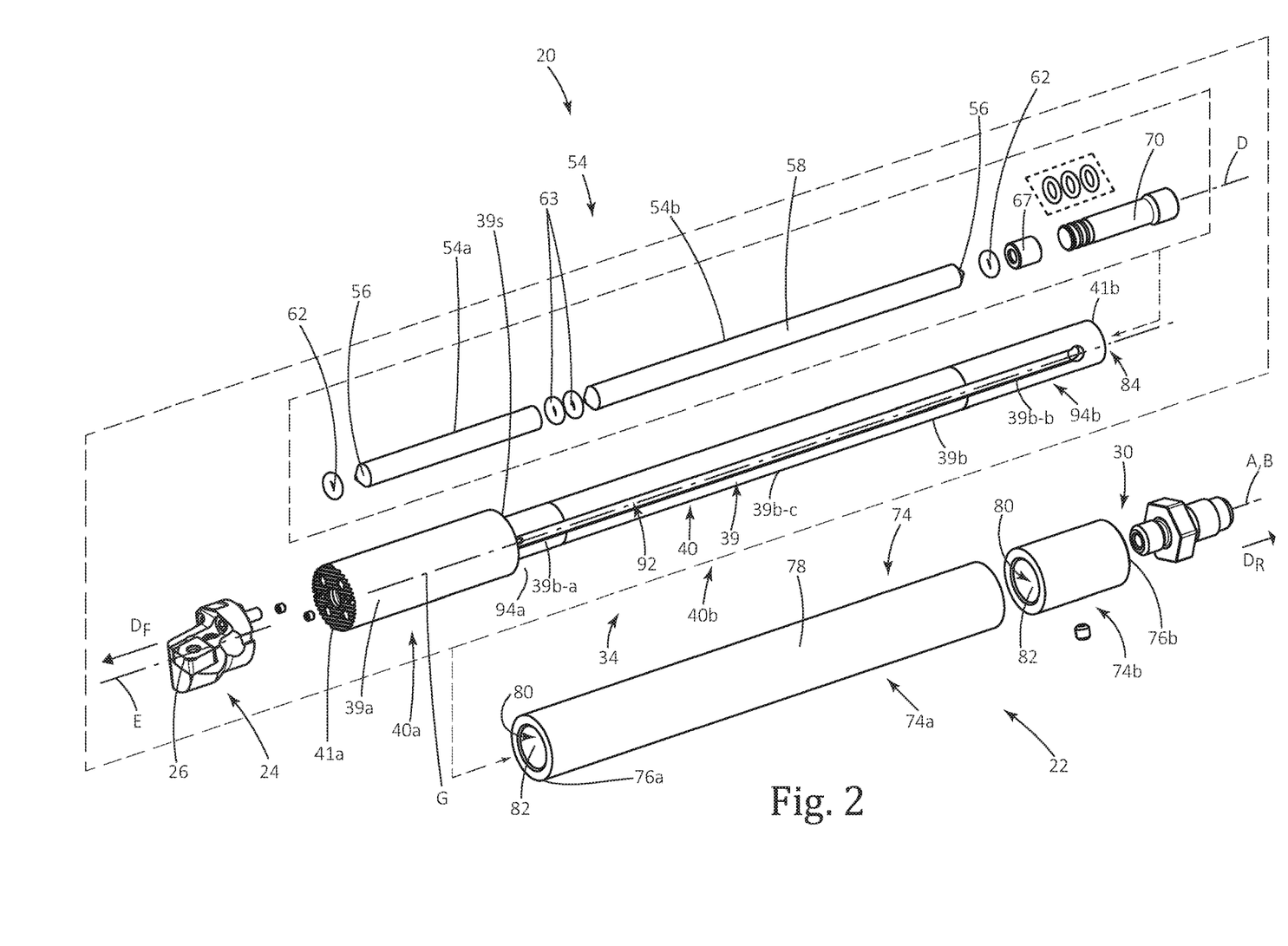
FIG. 2 is an exploded perspective view of the cutting tool in FIG. 1, in accordance with the present application.

Reference is now made to FIG. 2, showing an exploded view of the tool holder 22, depicting another aspect of the present application. The tool holder 22 has a holder longitudinal axis B, that defines opposite forward and rear directions $D_F$, $D_R$. The tool holder 22 is elongated along the holder longitudinal axis B. In accordance with some embodiments of the subject matter of the present application, the cutting tool 20 and the tool holder 22 can be co-axial with each other. It should be noted that two elements (e.g. the cutting tool 20 and the tool holder 22 in the present case) are co-axial with each other when their longitudinal axes are co-incident (aligned with other).

Figure 3:
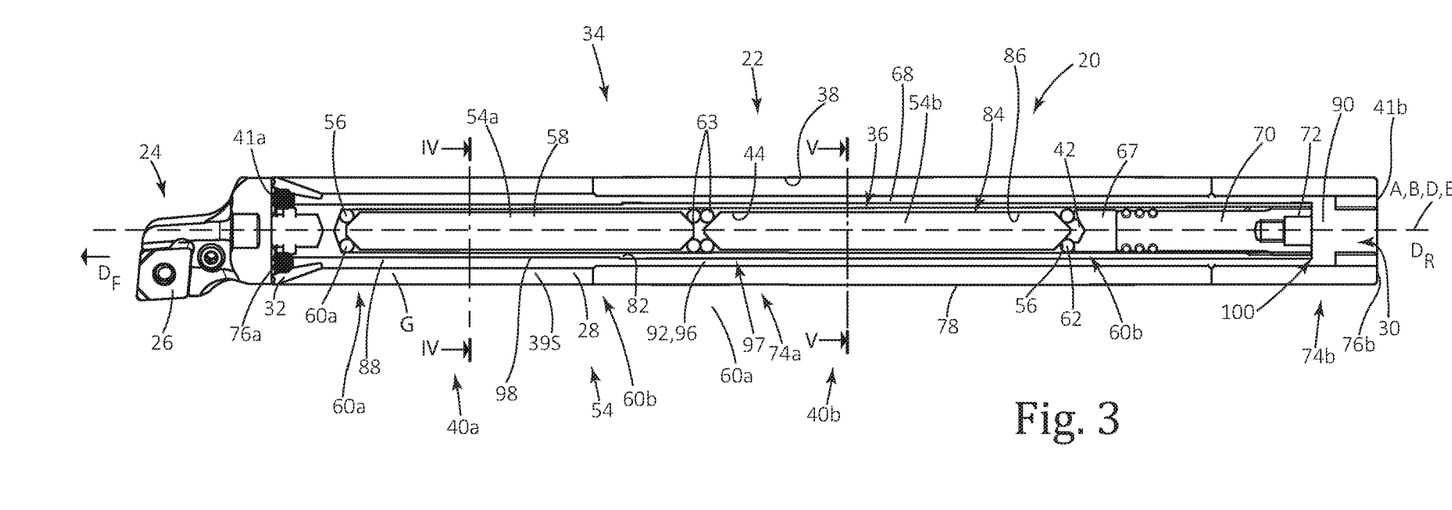
FIG. 3 is an axial cross-sectional view of the cutting tool in FIG. 1.
Figure 4:
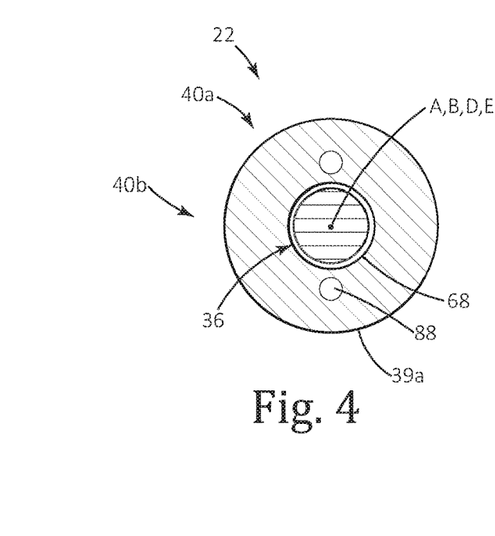
FIG. 4 is a radial cross-sectional view of the cutting tool in FIG. 1 taken along line IV-IV in FIG. 3.

It should further be noted that use of the terms "forward" and "rearward" throughout the description and claims refer to a relative position in a direction of the holder longitudinal axis B towards the left and right, respectively, in FIG. 3. Generally speaking, the forward direction is the direction towards the cutting portion 24.

Referring to FIG. 3, the tool holder 22 includes a tool holder coolant channel 28 having an external coolant inlet 30 and an external coolant outlet 32. The coolant inlet and outlet 30, 32 are in fluid communication with each other. Coolant travels through the tool holder 22 via the tool holder coolant channel 28 along a coolant flow path, F (indicated by the arrows in the figures). It should be noted that use of the term "external inlet/outlet" throughout the description and claims refer to an opening that is located at the periphery of the tool holder 22. Moreover, use of the term "internal inlet/outlet" throughout the description and claims refer to an opening that is located inside of the tool holder 22.

As best seen in FIGS. 1 and 2, the tool holder 22 includes an outer sleeve 74. The outer sleeve 74 includes opposite forward and rearward sleeve end surfaces 76a, 76b and a sleeve peripheral surface 78 which extends therebetween. The outer sleeve 74 further includes a sleeve hole 80. The sleeve hole 80 has a sleeve hole wall surface 82 which opens out to the forward sleeve end surface 76a. In accordance with some embodiments of the subject matter of the present application, the sleeve hole wall surface 82 can open out to the rearward sleeve end surface 76b. In such a configuration, the sleeve hole 80 forms a through hole. In accordance with some other embodiments of the subject matter of the present application, the sleeve hole wall surface 82 may not open out to the rearward sleeve end surface 76. In such a configuration, the sleeve hole 80 forms a blind hole. The sleeve hole wall surface 82 can have a cylindrical shape. In the assembled cutting tool 20, the sleeve hole 80 may extend along with the tool longitudinal axis A.

In accordance with some embodiments of the subject matter of the present application, the outer sleeve 74 can include a forward outer sleeve component 74a and a rearward outer sleeve component 74b. The forward and rearward outer sleeve components 74a, 74b can be fixedly engaged with each other. The forward outer sleeve component 74a is forward of the rearward outer sleeve component 74b. It is noted that the sleeve hole 80 can be formed from a through hole in the forward outer sleeve component 74a and a blind hole in the rearward outer sleeve component 74b or a through hole in both the forward and rearward outer sleeve components 74a, 74b. The forward outer sleeve component 74a can be longer than the rearward outer sleeve component 74b, as measured between the forward and rearward sleeve end surfaces 76a, 76b.

The outer sleeve 74 comprises a sleeve material. In accordance with some embodiments of the subject matter of the present application, the sleeve material can be carbide.

The tool holder 22 also includes a mass housing portion 40. The mass housing portion 40 includes opposite forward and rearward housing end surfaces 41a, 41b and a housing peripheral surface 39 which extends therebetween. In the assembled tool holder 22, the housing peripheral surface 39 extends about the holder longitudinal axis B.

In accordance with some embodiments of the subject matter of the present application, the mass housing portion 40 can include a housing recess 84. The housing recess 84 can include an inwardly facing recess wall surface 86. The recess wall surface 86 can open out to the rearward housing end surface 41b.

In accordance with some embodiments of the subject matter of the present application, the mass housing portion 40 can include a forward housing portion 40a and a rearward housing portion 40b. The forward housing portion 40a can be located forward of the rearward housing portion 40b. The forward housing portion 40a can have a greater radial dimension than the rearward housing portion 40b. The forward housing portion 40a is configured to have a cutting portion 24 affixed thereat. For this purpose, in this non-limiting example shown in the drawings, the forward housing end surface 41a is serrated for engagement with a corresponding surface of the cutting portion 26.

In accordance with some embodiments of the subject matter of the present application, the housing peripheral surface 39 can include a forward housing peripheral surface 39a at the forward housing portion 40a and a rearward housing peripheral surface 39b at the rearward housing portion 40b. The housing peripheral surface 39 can include a housing step surface 39s which connects the forward housing peripheral surface 39a and the rearward housing peripheral surface 39b. The housing step surface 39s can face the rearward direction $D_R$, preferably being oriented perpendicular to the holder longitudinal axis B.

Figure 6:
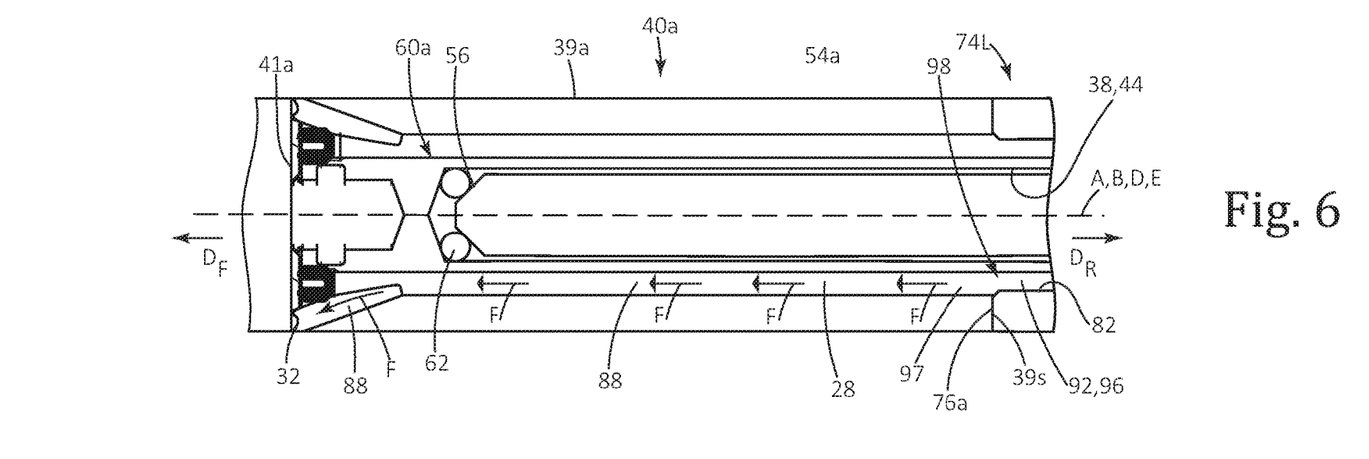
FIG. 6 is a first detail of FIG. 3.

Referring to FIG. 6, in accordance with some embodiments of the subject matter of the present application, the forward housing portion 40a can include a forward housing coolant through channel 88 which can open out, at a rearward end thereof, to the housing step surface 39s. At a forward end thereof, the forward housing coolant through channel 88 can further open out to the housing peripheral surface 39 or the forward housing peripheral surface 39a or the intersection of both the housing peripheral surface 39 and the forward housing peripheral surface 39a to form the coolant outlet 32.

Figure 7:
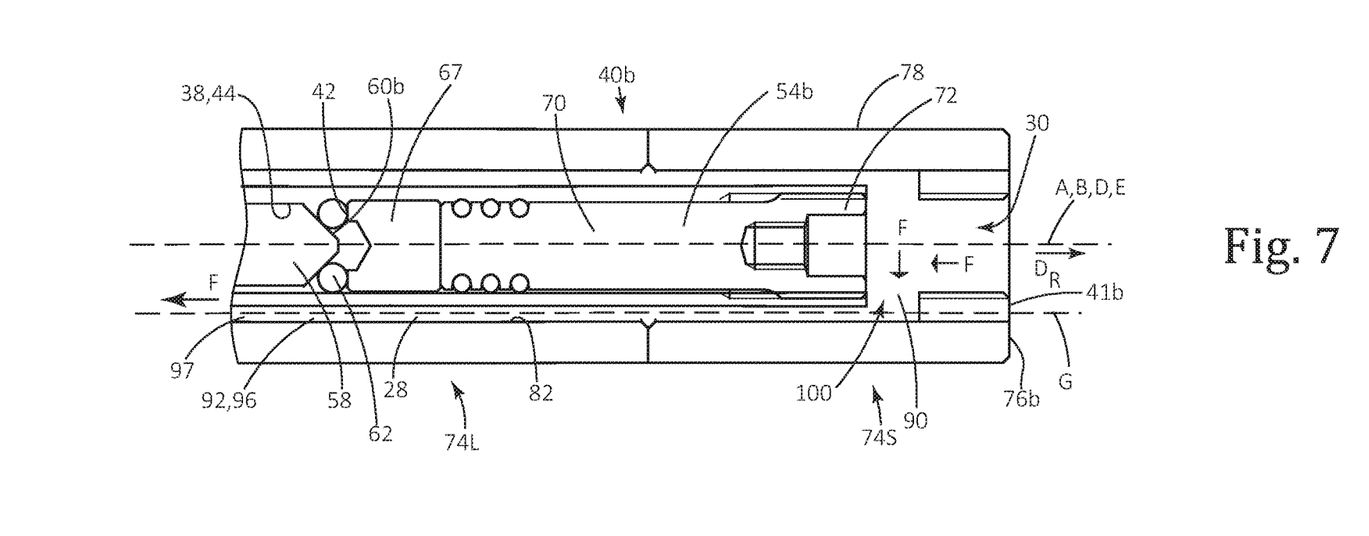
FIG. 7 is a second detail of FIG. 3.

Referring to FIG. 7, in accordance with some embodiments of the subject matter of the present application, the rearward housing portion 40b can include a rearward housing coolant through channel 90 which can open out to the recess wall surface 86 and the rearward housing peripheral surface 39b.

In accordance with some embodiments of the subject matter of the present application, the rearward housing peripheral surface 39b can include front and back rearward housing peripheral surfaces 39b-a, 39b-b which are axially spaced apart from one another along the holder longitudinal axis B. The front rearward housing peripheral surface 39b-a is closer to the forward housing portion 40a than the back rearward housing peripheral surface 39b-b. The front rearward housing peripheral surface 39b-a can intersect the housing step surface 39s. The front and back rearward housing peripheral surfaces 39b-a, 39b-b can have a cylindrical shape. The rearward housing peripheral surface 39b can include a middle rearward housing peripheral surface 39b-c which extends between the front and back rearward housing peripheral surfaces 39b-a, 39b-b. The middle rearward housing peripheral surface 39b-c can be radially recessed with respect to the front and back rearward housing peripheral surfaces 39b-a, 39b-b. That is to say, the middle rearward housing peripheral surface 39b-c can form an annular recess. As such, the middle rearward housing peripheral surface 39b-c may have a maximum radial cross-section which is smaller than the maximum radial cross-section of both the front and back rearward housing peripheral surfaces 39b-a, 39b-b.

The mass housing portion 40 comprises a housing body material. In accordance with some embodiments of the subject matter of the present application, the sleeve material can be denser than the housing body material.

The tool holder 22 includes an elongated groove 92 formed in one of the housing peripheral surface 39 and the sleeve hole wall surface 82. That is to say, the groove 92 is recessed in one of the housing peripheral surface 39 and the sleeve hole wall surface 82. In accordance with some embodiments of the subject matter of the present application, the groove 92 can be formed in the housing peripheral surface 39.

The groove 92 has two opposite groove ends 94a, 94b. One of the two groove ends 94a can be located at the back rearward housing peripheral surfaces 39b-b. The other one of the two groove ends 94b can be located at the intersection of the front rearward housing peripheral surface 39b-a and the housing step surface 39s. The groove 92 extends along a groove axis G. In accordance with some embodiments of the subject matter of the present application, the groove 92 can extend linearly along the groove axis G.

Figure 5:
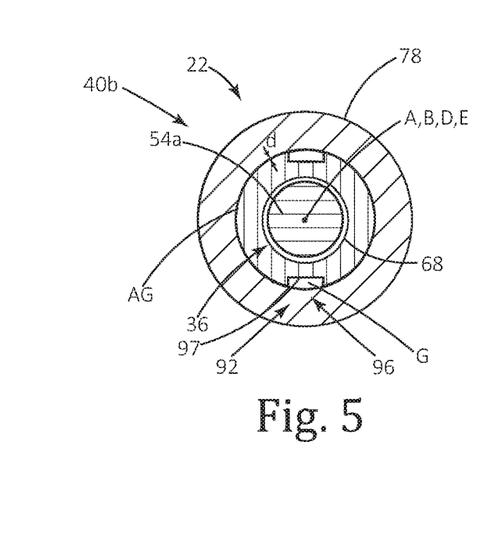
FIG. 5 is a radial cross-sectional view of the tool holder taken along line V-V in FIG. 3.
Figure 5A:
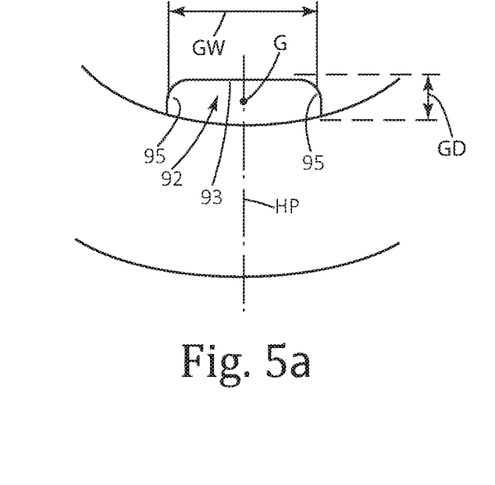
FIG. 5a is a detail of FIG. 5.

Referring to FIG. 5a, in accordance with some embodiments of the subject matter of the present application, the groove 92 can include two opposite groove side surfaces 95 located on opposite sides of a half plane HP which contains the holder longitudinal axis B and the groove axis G, and a groove base surface 93 extending between the two opposite groove side surfaces 95. The groove base surface 93 can extend along the groove axis G. The groove 92 can have a groove depth GD measured in a radially inward direction from a circumferential center of the groove base surface 93. The groove depth GD can be between 1 mm to 2 mm. The groove 92 can have a groove width GW measured in a direction between the two opposite groove side surfaces 95. The groove width GW can be between 3 mm to 4 mm.

The tool holder 22 includes an anti-vibration arrangement 34. The tool anti-vibration arrangement 34 is designed to reduce or eliminate vibration of the cutting tool 20 when the cutting tool 20 performs a metal cutting operation. In accordance with some embodiments of the subject matter of the present application, the anti-vibration arrangement 34 can be disposed at a forward end of the cutting tool 20.

The mass housing portion 40 has an interior holder cavity 36 formed therein. That is to say, the interior holder cavity 36 is enclosed within the mass housing portion 40. The holder cavity 36 is formed, at least in part, by an inwardly facing cavity wall surface 38. The cavity wall surface 38 delimits the holder cavity 36 from the mass housing portion 40. The mass housing portion 40 surrounds the holder cavity 36. The holder cavity 36 has a cavity central axis D. In accordance with some embodiments of the subject matter of the present application, the holder cavity 36 can be elongated along a cavity central axis D. The holder cavity 36 can be elongated in the same direction as the tool holder 22. In particular, the holder cavity 36 can be co-axial with the tool holder 22. The cavity wall surface 38 can include two opposite cavity wall end surfaces 42 and a cavity wall peripheral surface 44 that extends therebetween. The cavity wall peripheral surface 44 can extend about the cavity central axis D.

Referring in addition to FIG. 3, showing an axial cross-sectional view of the holder cavity 36 (taken in a plane containing the cavity central axis D) through the cavity wall peripheral surface 44, the holder cavity 36 has a cavity transverse cross-section. In accordance with some embodiments of the subject matter of the present application, said cavity transverse cross-section can be uniform along the cavity central axis D. The cavity wall peripheral surface 44 can have a generally cylindrical shape. The cavity wall peripheral surface 44 can have a cylindrical shape in the vicinity of the two cavity wall end surface 42. The two cavity wall end surfaces 42 can be planar and oriented transversely to the cavity central axis D. The two cavity wall end surfaces 42 can be oriented perpendicular to the cavity central axis D.

Reverting to FIGS. 1 and 2, the present tool holder 22 also includes an anti-vibration arrangement 34 which includes at least one vibration absorbing mass 54. In accordance with some embodiments of the subject matter of the present application, the vibration absorbing mass 54 can be rigid. In some embodiments, while the mass housing portion 40 is formed from a first metallic material such as steel, the vibration absorbing mass 54 may be formed from a denser second metallic material, such as tungsten.

Referring to FIGS. 2-3, the vibration absorbing mass 54 has a mass central axis E. The vibration absorbing mass 54 includes two axially opposite mass ends 60a, 60b, a forward mass end 60a and a rearward mass end 60b, the forward mass end 60a being forward of the rearward mass end 60b. The two axially opposite mass ends 60a, 60b are spaced apart from one another along the mass central axis E. In accordance with some embodiments of the subject matter of the present application, the vibration absorbing mass 54 can include two opposite mass end surfaces 56 and a mass peripheral surface 58 that extends therebetween. The mass peripheral surface 58 can extend about the mass central axis E. The two mass end surfaces 56 are located at the two mass ends 60a, 60b, respectively. The vibration absorbing mass 54 can be elongated along the mass central axis E. Between the mass end surfaces 56, the vibration absorbing mass 54 can have a generally constant cross-sectional area in a plane oriented perpendicular to the mass central axis E.

Referring to FIG. 3, in accordance with some embodiments of the subject matter of the present application, the mass end surfaces 56 can be conically shaped, tapering inwardly in a direction away from a central portion of the vibration absorbing mass 54. The mass peripheral surface 58 can have a cylindrical shape.

The anti-vibration arrangement 34 further includes two resilient suspension members 62. The two suspension members 62 are elastically deformable. In accordance with some embodiments of the subject matter of the present application, the two suspension members 62 can be formed from a material different from that of the vibration absorbing mass 54. In some embodiments, the suspension members 62 are made of rubber, having a Durometer hardness of between 60 A to 95 A. The two suspension members 62 can be o-rings.

The tool holder 22 is adjustable between an unassembled state and an assembled state. In the unassembled state of the tool holder 22, the vibration absorbing mass 54 is disposed outside the interior holder cavity 36 and/or the mass housing portion 40 is not secured to the outer sleeve 74.

In accordance with some embodiments of the subject matter of the present application, referring to FIG. 3, the tool holder 22 includes a cavity axial sealing member 67 which defines (delimits) the holder cavity 36 in the rearward direction $D_R$, and which seals the holder cavity 36. That is to say, the cavity axial sealing member 67 forms one of the cavity wall end surface 38. While the holder cavity 36 is unsealed by the cavity axial sealing member 67 (i.e. while the tool holder 22 is in an unassembled position), the vibration absorbing mass 54 can be inserted into the holder cavity 36.

In the assembled state of the tool holder 22, the vibration absorbing mass 54 is disposed within the holder cavity 36.

In the assembled position of the tool holder 22, in accordance with some embodiments of the subject matter of the present application, the vibration absorbing mass 54 can be elongated in the same direction as the tool holder 22. That is to say, the mass central axis E can be parallel to the holder longitudinal axis B with axes B, E establishing the longest principal dimensions of the tool holder 22 and the vibration absorbing mass 54, respectively. In particular, the mass central axis E can be co-incident with the holder longitudinal axis B (i.e. the vibration absorbing mass 54 can be co-axial with the tool holder 22).

In the assembled position of the tool holder 22, the vibration absorbing mass 54 is connected to the mass housing portion 40 via the two suspension members 62. Thus, the vibration absorbing mass 54 is elastically suspended in the holder cavity 36 by the two suspension members 62 which contact the inwardly facing cavity wall surface 38. Each suspension member 62 can abut a respective mass end surface 56. It is noted that no part of the mass peripheral surface 58 is in direct contact with the inwardly facing cavity wall surface 38. In accordance with some embodiments of the subject matter of the present application, each of the two suspension members 62 can be under compressive elastic deformation by contact against the inwardly facing cavity wall surface 38 and against one of the mass end surfaces 56.

In the assembled position of the tool holder 22, the mass housing portion 40 is at least partially located in the sleeve hole 80. In accordance with some embodiments of the subject matter of the present application, only the rearward housing portion 40b can be located in the sleeve hole 80. The sleeve peripheral surface 78 extends about the holder longitudinal axis B.

At least a portion of the sleeve hole wall surface 82 surrounds at least a portion of the mass housing portion 40. More particularly, at least a portion of the sleeve hole wall surface 82 faces a portion of the housing peripheral surface 39 along a common interface. Still more particularly, at the common interface, at least a portion of the sleeve hole wall surface 82 faces the rearward housing peripheral surface 39b.

In accordance with some embodiments of the subject matter of the present application, at the common interface the front, back and middle rearward housing peripheral surfaces 39b-a, 39b-b, 39b-c can all abut the sleeve hole wall surface 82. Alternatively, in accordance with some other embodiments of the subject matter of the present application, at the common interface some portions of the rearward housing peripheral surface 39b may not abut the sleeve hole wall surface 82. For example, the front and back rearward housing peripheral surfaces 39b-a, 39b-b can abut the sleeve hole wall surface 82 while the middle rearward housing peripheral surface 39b-c can be spaced apart from the sleeve hole wall surface 82 by a distance d (e.g. in the configuration where the middle rearward housing peripheral surface 39b-c is recessed with respect to the front and back rearward housing peripheral surfaces 39b-a, 39b-b—see FIG. 5). The later configuration is easier to manufacture than the former configuration. The forward sleeve end surface 76a and the housing step surface 39s can abut each other. In accordance with some embodiments of the subject matter of the present application preferably, a shrink-fit engagement is used for coupling the (heated) outer sleeve 74 with the mass housing portion 40. Moreover, the forward sleeve end surface 76a and the housing step surface 39s can be fixedly brazed together.

The groove 92 is located at the common interface to form a groove coolant channel 96. The tool holder coolant channel 28 is formed partially by the groove coolant channel 96. That is to say, the groove coolant channel 96 is part of a tool holder coolant channel 28. The groove coolant channel 96 includes a groove coolant wall surface 97. The groove coolant wall surface 97 extends about the groove axis G. The groove coolant channel 96 has a groove coolant inlet 98 and a groove coolant outlet 100. In accordance with some embodiments of the subject matter of the present application, the groove coolant inlet 98 and/or the groove coolant outlet 100 can be internal. The groove coolant inlet 98 can be located at one of the two groove ends 94b and the groove coolant outlet 100 can be located at the other one of the two groove ends 94a. The groove axis G can be parallel to the holder longitudinal axis B.

In the configuration where the front, back and middle rearward housing peripheral surfaces 39b-a, 39b-b, 39b-c all abut the sleeve hole wall surface 82, the groove coolant wall surface 97 is formed by the groove 92 (i.e. the groove base surface 93 and the two groove side surfaces 95) and an opposing portion of whichever one of the housing peripheral surface 39 and the sleeve hole wall surface 82 the groove 92 is not formed.

In the configuration where the middle rearward housing peripheral surface 39b-c is spaced apart from the sleeve hole wall surface 82, the groove coolant wall surface 97 is formed as described in the previous sentence and also by a thin annular gap AG formed between the spaced apart middle rearward housing peripheral surface 39b-c and sleeve hole wall surface 82, which merges with the groove 92 in a circumferential direction (see FIG. 5). It is noted that the volume define by the thin annular gap AG can be negligible. For example, the distance d can have a value which ensures that the flow of coolant along the groove coolant channel 96 is not detrimentally affected. For example, even though coolant may seep into the annular gap AG, high pressure coolant flow can still be realized. The distance d can be equal or less than 0.07 mm. More preferably, the distance d can be equal or less than 0.05 mm.

In accordance with some embodiments of the subject matter of the present application, the groove coolant channel 96 can extend to the forward housing coolant through channel 88. Thus, it is noted that in the configuration with the groove 92 formed in the housing peripheral surface 39, the groove 92 extends to the forward housing coolant through channel 88. The tool holder coolant channel 28 can be further partially formed by the forward housing coolant through channel 88. That is to say, the forward housing coolant through channel 88 is part of the tool holder coolant channel 28.

In accordance with some embodiments of the subject matter of the present application, the cavity axial sealing member 67 can be located in the housing recess 84, delimiting the holder cavity 36 in the rearward direction $D_R$. Thus, a forward portion of the housing recess 84 forms the interior holder cavity 36. The rearward housing coolant through channel 90 can be rearward of the cavity axial sealing member 67. The tool holder coolant channel 28 can be further partially formed by the rearward housing coolant through channel 90. That is to say, the rearward housing coolant through channel 90 is part of the tool holder coolant channel 28.

In accordance with some embodiments of the subject matter of the present application, the recess wall surface 86 can open out to the rearward housing end surface 41b to form the coolant inlet 30. The tool holder coolant channel 28 can be further partially formed by a portion of the housing recess 84 which extend from the coolant inlet 30. That is to say, a portion of the housing recess 84 which extend from the coolant inlet 30 is part of the tool holder coolant channel 28.

In accordance with some embodiments of the subject matter of the present application, the coolant outlet 32 can be rotationally aligned with the cutting insert 26 about the holder longitudinal axis B. This allows the coolant to be directed at the cutting interface between a cutting edge and a workpiece.

The anti-vibration arrangement 34 includes an oscillating space 68 formed in the holder cavity 36. The oscillating space 68 is located between the vibration absorbing mass 54 and the mass housing portion 40 (and more particularly between the vibration absorbing mass 54 and the inwardly facing cavity wall surface 38). Stated differently, the mass housing portion 40 and the vibration absorbing mass 54 are spaced apart by the oscillating space 68. In accordance with some embodiments of the subject matter of the present application, the oscillating space 68 entirely circumferentially surrounds the vibration absorbing mass 54. That is to say, the oscillating space 68 can extend about the full (360°) angular extent of the cavity central axis D. The oscillating space 68 can thus be considered an annular oscillating space that surrounds an axial extent of the vibration absorbing mass 54.

The vibration absorbing mass 54 is configured to oscillate within the oscillating space 68 upon elastic deformation of the two suspension members 62. Stated differently, the vibration absorbing mass 54 is oscillatingly displaceable within the oscillating space 68 when the two suspension members 62 undergo elastic deformation.

When the cutting tool 20 encounters a workpiece, it is susceptible to vibration. Typically, for turning or milling cutting operations the vibrations are lateral vibrations. Typically, for drilling cutting operations, the vibrations are torsional vibrations. The vibration absorbing mass 54 oscillates at a vibration frequency. The anti-vibration arrangement is 34 designed to provide the vibration absorbing mass 54 with a vibration frequency close to, if not identical to, the natural frequency of the cutting tool 20, thereby reducing or eliminating vibration of the cutting tool 20.

Advantageously, the anti-vibration arrangement 34 can be tunable (so that the vibration frequency of the vibration absorbing mass 54 matches the natural frequency of the cutting tool (20) without the need to disassemble any separable parts. One or more mechanisms, alone or in combination, can be used to alter the vibration frequency at which the vibration absorbing mass 54 oscillates. In one non-limiting example, the at least two suspension members 62 can be pre-loaded. For example, referring to FIG. 3, the anti-vibration arrangement 34 can include a tuning member 70 that protrudes into the oscillating space 68. The tuning member 70 can be a screw having a threaded portion 72 (see FIG. 7). The tuning member 70 can abut the cavity axial sealing member 67. The tuning member 70 can be displaceable along the cavity central axis D, and thus also displaces the cavity axial sealing member 67, thereby adjusting the elastic properties of the two suspension members 62. In accordance with some embodiments of the subject matter of the present application, the oscillating space 68 can be empty. For example, the oscillating space 68 can be devoid of viscous fluid.

It should be noted that one feature of the present arrangement is that the tool holder coolant channel 28 is isolated from the anti-vibration arrangement 34. In other words, the tool holder coolant channel 28 is not in fluid communication with the vibration absorbing mass 54. By virtue of such an arrangement, any potential leakage of coolant from the tool holder coolant channel 28 is not in the vicinity of the holder cavity 36 in which the vibration absorbing mass 54 is located. Thus, leaked coolant cannot interfere with the damping effect of the anti-vibration arrangement 34.

A further feature of the present arrangement is that it lacks a tube (as disclosed in U.S. Pat. No. 7,681,869 B2) that would interfere with oscillating of the vibration absorbing mass 54. Further moreover, the vibration absorbing mass 54 is solid in the sense that it does not have a hollow portion (e.g. for receiving a tube), which would reduce the weight of the vibration absorbing mass 54 itself.

Although the subject matter of the present application has been described to a certain degree of particularity, it should be understood that various alterations and modifications could be made without departing from the spirit or scope of the invention as hereinafter claimed.

For example, the groove coolant channel 96 can be formed from grooves formed in both the housing peripheral surface 39 and the sleeve hole wall surface 82, respectively. and the two grooves face each other, in the assembled tool holder.

Further for example, the tool holder 22 can include more than one coolant channel 96. Yet further for example, the anti-vibration arrangement 34 can include more than one vibration absorbing mass 54. In this non-limiting example shown in the drawings, the anti-vibration arrangement 34 includes two vibration absorbing masses 54a, 54b elastically connected by two central suspension members 63 (e.g. o-rings), while the aforementioned resilient suspension members 62 support end surfaces 56 belonging to two different vibration absorbing masses.

What is claimed is:
1. A tool holder (22) elongated along a holder longitudinal axis (B) thereof which defines opposite forward and rearward directions (DF, DR), the tool holder (22) configured to have a cutting portion (24) affixed at a forward end thereof, the tool holder (22) comprising:
   an outer sleeve (74) comprising:
      opposite forward and rearward sleeve end surfaces (76a, 76b) and a sleeve peripheral surface (78) extending therebetween; and
      a sleeve hole (80) having a sleeve hole wall surface (82) which opens out to the forward and rearward sleeve end surfaces (76a, 76b);
   a mass housing portion (40) comprising:
      a forward housing portion (40a) having a forward end surface (41a), a rearward housing portion (40b) having a rearward housing end surface (41b), and a housing peripheral surface (39) extending therebetween, the forward housing portion (40a) being forward of, and having a greater radial dimension than, the rearward housing portion (40b); and
      an interior holder cavity (36) having an inwardly facing cavity wall surface (38); and an anti-vibration arrangement (34) comprising:
- a vibration absorbing mass (54) comprising two opposite mass end surfaces (56) and a mass peripheral surface (58) extending therebetween; and
- two resilient suspension members (62), wherein:
- an elongated groove (92) is formed in one of the housing peripheral surface (39) and the sleeve hole wall surface (82); and
- the tool holder (22) is adjustable between an unassembled state and an assembled state, and in the assembled state:
  - the vibration absorbing mass (54) is disposed in the interior holder cavity (36) and is elastically suspended therein by the two suspension members (62) contacting the inwardly facing cavity wall surface (38);
  - only the rearward housing portion (40*b*) is located in the sleeve hole (80), such that at least a portion of the sleeve hole wall surface (82) surrounds at least a portion of the housing peripheral surface (39) about the holder longitudinal axis (B), thereby defining a common interface;
  - the groove (92) is located at the common interface, thereby forming a groove coolant channel (96); and
  - the groove coolant channel (96) is part of a tool holder coolant channel (28) having an external coolant inlet (30) and an external coolant outlet (32) in fluid communication with each other.

2. The tool holder (22), according to claim 1, wherein the groove (92) is formed in the housing peripheral surface (39).

3. The tool holder (22), according to claim 1, wherein the sleeve hole wall surface (82) opens out to the rearward sleeve end surface (76*b*).

4. The tool holder (22), according to claim 1, wherein:
- the groove (92) extends linearly along a groove axis (G); and
- in the assembled state of the tool holder (22), the groove axis (G) is parallel to the holder longitudinal axis (B).

5. The tool holder (22), according to claim 1, wherein:
- the housing peripheral surface (39) comprises:
  - a forward housing peripheral surface (39*a*) at the forward housing portion (40*a*);
  - a rearward housing peripheral surface (39*b*) at the rearward housing portion (40*b*); and
- a housing step surface (39*s*) connecting the forward housing peripheral surface (39*a*) and the rearward housing peripheral surface (39*b*);
- the forward housing portion (40*a*) comprises a forward housing coolant through channel (88) opening out, at a rearward end thereof, to the housing step surface (39*s*);
- in the assembled state of the tool holder (22), the groove coolant channel (96) extends to the forward housing coolant through channel (88); and
- the forward housing coolant through channel (88) is part of the tool holder coolant channel (28).

6. The tool holder (22), according to claim 5, wherein the forward housing coolant through channel (88) further opens out, at a forward end of the forward housing portion (40*a*), to the housing peripheral surface (39) to form the coolant outlet (32).

7. The tool holder (22), according to claim 5, wherein:
- the mass housing portion (40) comprises a housing recess (84) comprising an inwardly facing recess wall surface (86) opening out to the rearward housing end surface (41*b*);
- the tool holder (22) comprises a cavity axial sealing member (67);
- in the assembled state of the tool holder (22), the cavity axial sealing member (67) is located in the housing recess (84), delimiting the holder cavity (36) in the rearward direction (DR), so that a forward portion of the housing recess (84) forms the interior holder cavity (36);
- the rearward housing portion (40*b*) comprises a rearward housing coolant through channel (90) opening out to the recess wall surface (86) and the rearward housing peripheral surface (39*b*); and
- in the assembled state of the tool holder (22), the rearward housing coolant through channel (90) is rearward of the cavity axial sealing member (67), and the rearward housing coolant through channel (90) is part of the tool holder coolant channel (28).

8. The tool holder (22), according to claim 7, wherein:
- the outer sleeve (74) comprises a forward outer sleeve component (74*a*) and a rearward outer sleeve component (74*b*); and
- the forward and rearward outer sleeve components (74*a*, 74*b*) are fixedly engaged with each other, the forward outer sleeve component (74*a*) being forward of the rearward outer sleeve component (74*b*).

9. The tool holder (22), according to claim 5, wherein in the assembled state of the tool holder (22), the forward sleeve end surface (76*a*) and the housing step surface (39*s*) abut each other.

10. The tool holder (22), according to claim 5, wherein:
- the rearward housing peripheral surface (39*b*) comprises axially spaced apart front and back rearward housing peripheral surfaces (39*b-a*, 39*b-b*) and a middle rearward housing peripheral surface (39*b-c*) extending therebetween, the front rearward housing peripheral surface (39*b-a*) being closer to the forward housing portion (40*a*) than the back rearward housing peripheral surface (39*b-b*); and
- in the assembled state of the tool holder (22), at least the front and back rearward housing peripheral surfaces (39*b-a*, 39*b-b*) abut the sleeve hole wall surface (82), respectively.

11. The tool holder (22), according to claim 10, wherein:
- the groove (92) is formed in the housing peripheral surface (39);
- the groove (92) comprises two groove ends (94*a*, 94*b*);
- the front rearward housing peripheral surface (39*b-a*) intersects the housing step surface (39*s*);
- one of the two groove ends (94*b*) is located at the back rearward housing peripheral surfaces (39*b-b*); and
- the other one of the two groove ends (94*a*) is located at the intersection of the front rearward housing peripheral surface (39*b-a*) and the housing step surface (39*s*).

12. The tool holder (22), according to claim 10, wherein:
- the middle rearward housing peripheral surface (39*b-c*) is radially recessed with respect to the front and back rearward housing peripheral surfaces (39*b-a*, 39*b-b*); and
- in the assembled state of the tool holder (22), the middle rearward housing peripheral surface (39*b-c*) is spaced apart from the sleeve hole wall surface (82).

13. The tool holder (22), according to claim 1, wherein:
- the mass housing portion (40) comprises a housing recess (84) comprising an inwardly facing recess wall surface (86) opening out to the rearward housing end surface (41*b*);
- the tool holder (22) comprises a cavity axial sealing member (67); and
- in the assembled state of the tool holder (22), the cavity axial sealing member (67) is located in the housing recess (84), delimiting the holder cavity (36) in the rearward direction (DR), so that a forward portion of the housing recess (84) forms the interior holder cavity (36).

14. The tool holder (22), according to claim 13, wherein:
in the assembled state of the tool holder (22), the recess wall surface (86) opens out to the rearward housing end surface (41b) to form the coolant inlet (30); and
a portion of the housing recess (84) extending from the coolant inlet (30) is part of the tool holder coolant channel (28).

15. The tool holder (22), according to claim 1, wherein:
the outer sleeve (74) comprises a sleeve material;
the mass housing portion (40) comprises a housing body material; and
the sleeve material is denser than the housing body material.

16. The tool holder (22), according to claim 15, wherein the sleeve material is carbide.

17. A cutting tool (20) comprising:
a tool holder (22) in accordance with claim 1; and
a cutting portion (24) located at a forward end of the tool holder (22), the cutting portion (24) comprising at least one cutting insert (26).

18. The cutting tool (20), according to claim 17, wherein the cutting portion (24) is releasably attached to the tool holder (22).

19. The cutting tool (20), according to claim 17, wherein the coolant outlet (32) is rotationally aligned with the cutting insert (26) about the holder longitudinal axis (B).

\* \* \* \* \*